May 12, 1959   R. E. ZOLLER   2,886,012
VAPOR GENERATORS FOR MIXED POWER PLANTS
Filed Oct. 1, 1951   6 Sheets-Sheet 1
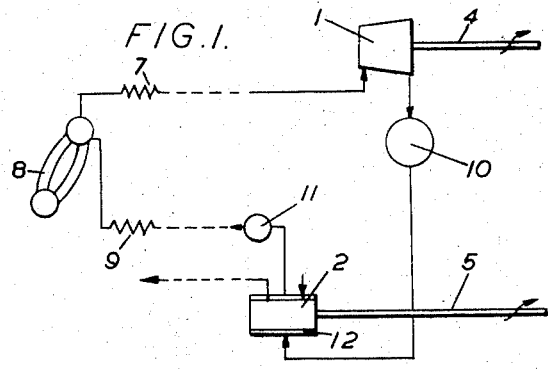
FIG. 1.
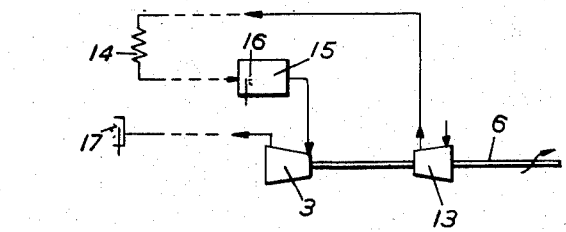
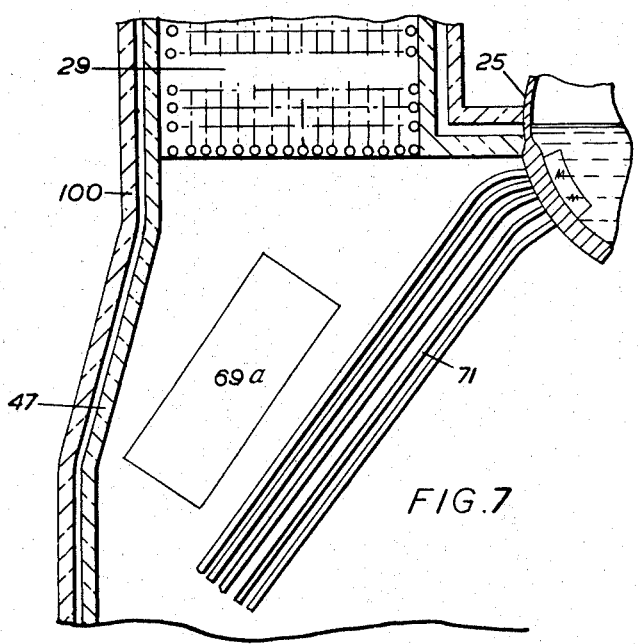
FIG. 7
INVENTOR.
Ronald Ernest Zoller
BY
*J. P. Moran*
ATTORNEY INVENTOR.
Ronald Ernest Zoller
BY
ATTORNEY

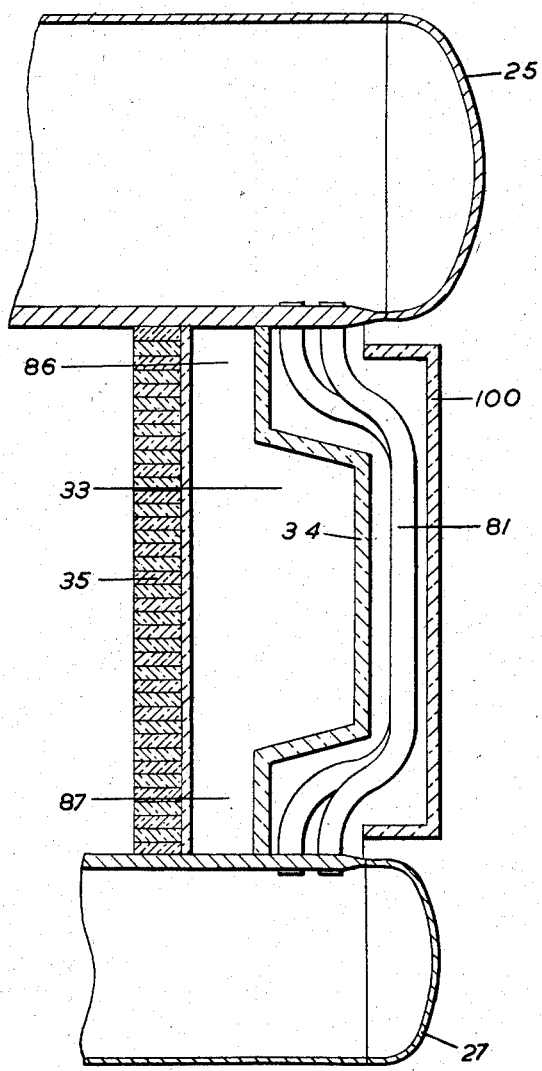

United States Patent Office 2,886,012
Patented May 12, 1959

2,886,012

VAPOR GENERATORS FOR MIXED POWER PLANTS

Ronald Ernest Zoller, London, England, assignor to The Babcock & Wilcox Company, Rockleigh, N.J., a corporation of New Jersey Application October 1, 1951, Serial No. 249,101

3 Claims. (Cl. 122—240)

This invention relates to tubular vapor generators and mixed power plants incorporating the same. In mixed power plants of the kind comprising vapor and gas turbines, the vapor and gas turbines respectively require a supply of vapor at appropriate pressure and temperature and a supply of gas at appropriate pressure and temperature. Such mixed power plants may also include an internal combustion engine, in which case provisions may advantageously be made for utilizing the waste heat from the engine. When air is used as the working medium for the gas turbine, the hot air discharged in appropriate quantity from the turbine may suitably be utilized as combustion air for the vapor generator.

An object of the invention is the provision of an advantageous form of tubular vapor generator for providing vapor at controlled pressure and temperature and gaseous fluid at controlled temperature.

A further object is the provision of such a vapor generator adapted to utilize heat in the exhaust gases of an internal combustion engine.

A still further object is to provide a vapor generator adapted for operation with air as combustion air which is discharged from a gas turbine.

Yet another object is the provision of a vapor generator of compact construction suitable for providing vapor and hot gases for use in the vapor and gas turbines of a ship propulsion system.

Another object is the provision of a mixed power plant incorporating an advantageous form of tubular vapor generator.

The present invention includes a tubular vapor generator comprising a furnace divided to form two combustion chambers, parallel gas flow paths leading from one combustion chamber, damper means for varying the distribution of furnace gases between the paths, banks of vapor generating tubes in the paths, an elastic fluid heater disposed mainly or wholly in one of the paths, a second elastic fluid heater in the gas flow path from the second combustion chamber and a bank of vapor generating tubes between the second combustion chamber and the second elastic fluid heater.

The invention also includes a tubular vapor generator comprising a furnace divided to form two combustion chambers, the directions of the gases leaving which are respectively towards one side and towards the other side of the vapor generator, an elastic fluid heater and a bank of vapor generating tubes in the gas flow path from one combustion chamber, a second elastic fluid heater and a second bank of vapor generating tubes in the gas flow path from the second combustion chamber, one of the gas flow paths from a combustion chamber including a passage for leading gases from the said combustion chamber transversely across the vapor generator towards a gas uptake to one side of the vapor generator arranged to receive the gases from both combustion chambers.

The invention moreover includes a mixed power plant comprising a vapor generator provided with a vapor superheater, a vapor turbine adapted to be supplied for operation with superheated vapor from the vapor generator, a gas turbine, and an elastic fluid heater arranged for the heating by vapor generator combustion gases of gaseous fluid in the gas flow path to the gas turbine, wherein the vapor generator comprises two combustion chambers for providing combustion gases for vapor generation and the elastic fluid heater is arranged in a gas flow path from one of the combustion chambers.

The invention will now be described, by way of example, with reference to the accompanying drawings, in which:

Fig. 1 illustrates schematically a mixed power plant comprising a steam turbine, a gas turbine, and a diesel engine;

Fig. 6 is a side sectional elevation of a part of the steam generator taken on the line VI—VI of Fig. 5; and Fig. 7 is a sectional view similar to a part of Fig. 5 illustrating a modification of the steam generator.

Figure 2:
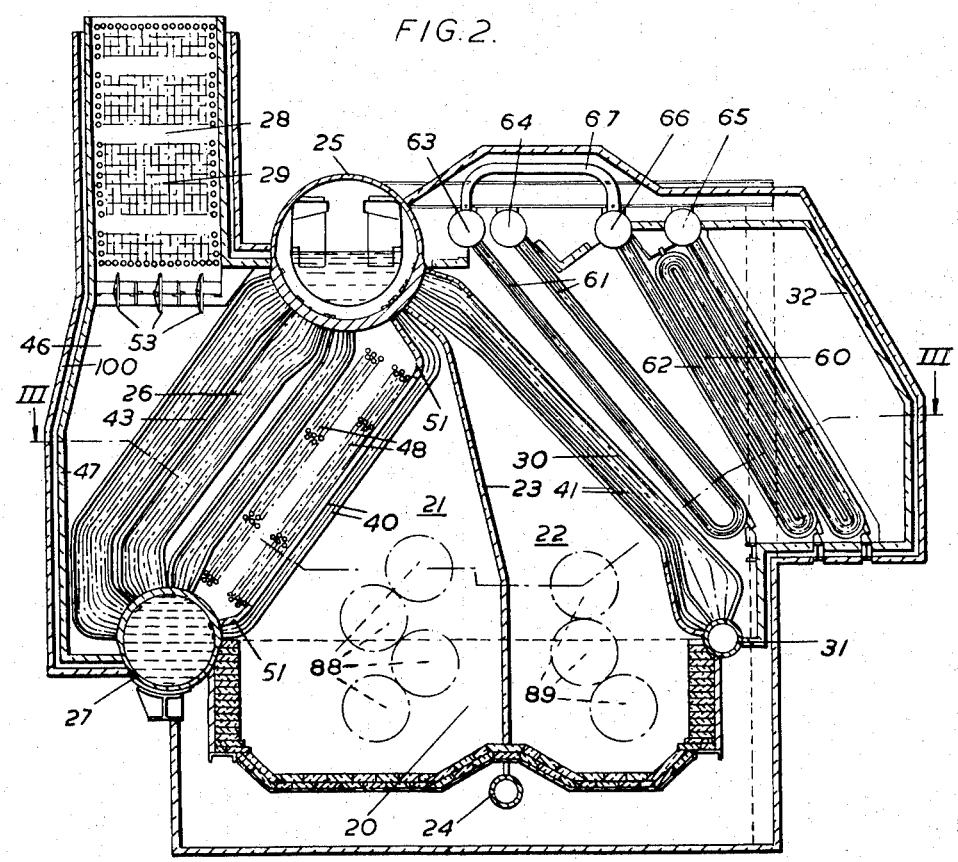
Fig. 2 is a front sectional elevation taken on the line II—II of Fig. 3, of a tubular steam generator adapted for use in the mixed power plant of Fig. 1.

Referring to Fig. 1 of the drawings, a steam turbine 1, a diesel engine 2, and a gas turbine 3 produce power at respective shafts 4, 5, and 6. The steam for the steam turbine passes through a superheater 7 after generation in a bank of steam generating tubes 8 supplied with water through an economizer 9. The steam from the steam turbine is condensed in a condenser 10, and before the water of the steam-water cycle is re-introduced into the economizer by a boiler pump 11, it is used as cooling water in the jacket 12 of the diesel engine. The diesel engine exhaust gases contain heat which is capable of use by heat receiving elements in the steam-water cycle.

The gas turbine 3 drives an air compressor 13, which forces air under pressure, after first passing it through an air heater 14, into a chamber 15 where its temperature is further raised by the combustion of fuel at 16 supplied in an amount which is small compared with the quantity of fuel capable of being burned by the air. The high temperature gases leaving the chamber 15 under pressure drive the gas turbine 3. The exhaust gases from the gas turbine 3 are used to provide the air for combustion at 17 of the fuel which furnishes most of the heat for the steam-water cycle, and the gas turbine part of the plant is operated with reference to the steam turbine requirements to supply, over an operative load range of the plant, the combustion requirements of the fuel introduced at 17.

Fig. 1 does not disclose the details of the mixed power plant, such as valves and by-pass or other additional connections that may be necessary or desirable, and features that may be thermodynamically desirable, such as regeneration in the steam-water cycle.

The plant is designed to provide the major part of the available power at shaft 4, and more power at the shaft 5 than at the shaft 6. The major part of the fuel is burned at 17 and more fuel is burned at 16 than is supplied to the diesel engine. The plant secures the use of gas turbine and diesel powers with exploitation of heat in the diesel engine exhaust gases, heat in the gas turbine exhaust gases and heat from the diesel engine cylinder blocks, and gains advantage in the use to a major extent of boiler oil fuel which is less expensive than the distillate oil fuel required in connection with the diesel engine and gas turbine.

The tubular steam generator shown in Figs. 2 to 6 is especially adapted for use in the mixed power plant described when applied to ship propulsion. Incorporated in a plant such as that of Fig. 1, it provides for heating fluid in a steam-water cycle (as the pressure parts 7, 8 and 9 in Fig. 1 need to be heated), and for heating air (as the air heater 14 for the gas turbine 13 needs to be heated), by the combustion of oil fuel with the utilization of exhaust gases from the gas turbine and the recovery of heat from the exhaust gases from the diesel engine.

Figure 3:
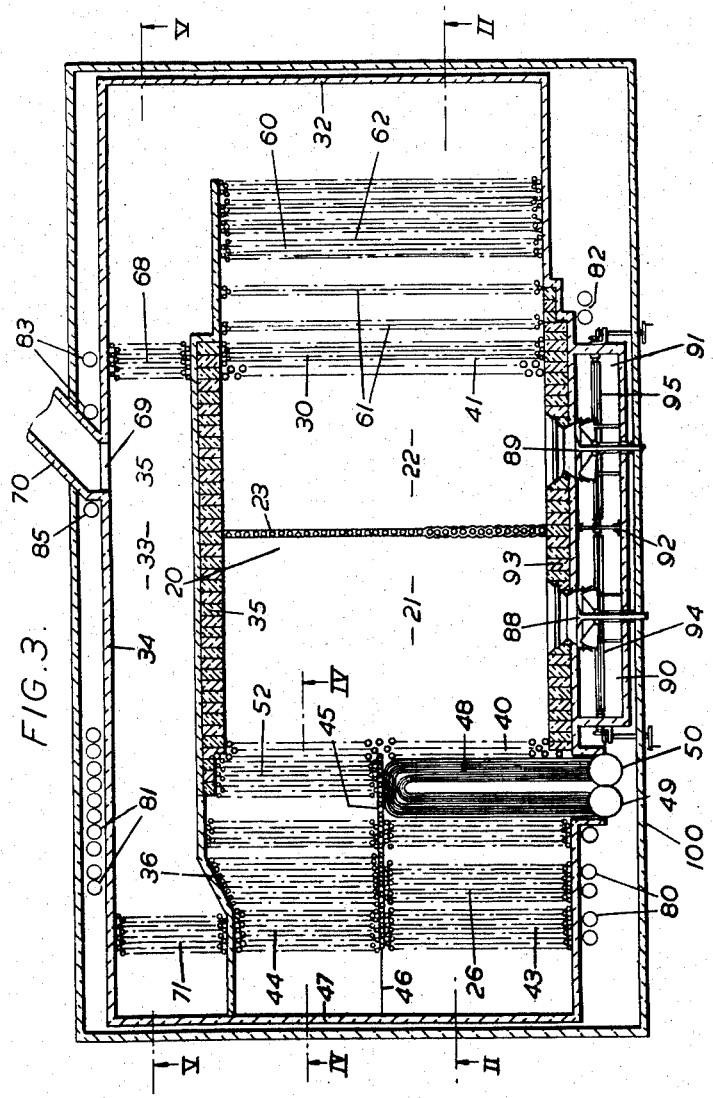
Fig. 3 is a view in section of the steam generator taken on the line III—III of Fig. 2 as regards the main portion thereof and, as regards the portion thereof to the rear of the wall 35, hereinafter referred to, on the lines IIIa—IIIa and IIIb—IIIb of Fig. 5.
Figure 4:
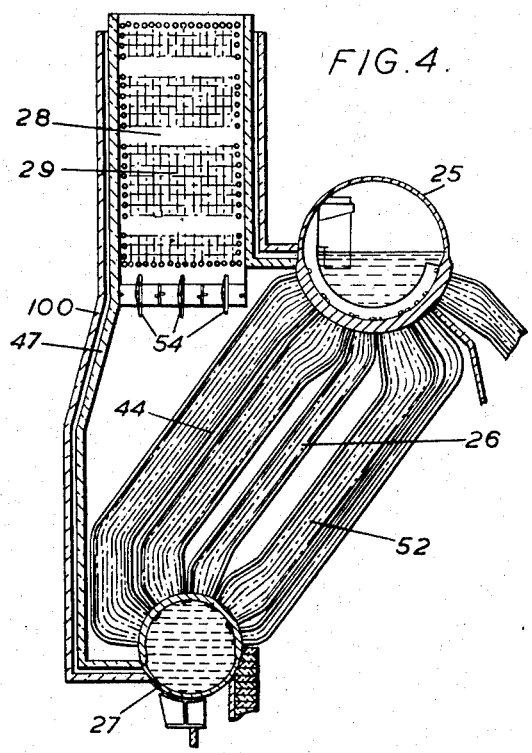
Fig. 4 is a front sectional elevation of a part of the steam generator taken on the line IV—IV of Fig. 3.

Referring to Figs. 2 to 6, the furnace 20 of the steam generator is divided into two combustion chambers 21 and 22 by an imperforate division wall 23 formed of a row of tubes connected at their lower ends into a lower header 24 and at their upper ends into a longitudinally extending steam and water drum 25 and provided with studs and with refractory applied to fill the gaps between the tubes and over the lower front part of the wall to cover the tubes completely, as indicated in Fig. 3.

The direction of gas flow from the combustion chamber 21 is upwardly and outwardly away from the division wall through an inclined bank 26 of vapor generating tubes which are connected into the upper drum 25 at their upper ends and into a lower water drum 27 at their lower ends. The gases from the bank 26 flow generally upwardly above the bank and enter an uptake 28 in which is disposed an economizer 29. The economizer comprises horizontal tubes connected by return bends to form sinuous water flow paths in which the water flows from the top of the economizer to the bottom. The bottom of the uptake 28 and the bottom of the economizer 29 are near the horizontal plane passing through the longitudinal axis of the upper drum 25.

The gases from the other combustion chamber 22 flow upwardly and outwardly away from the division wall 23 through an inclined bank 30 of vapor generating tubes which are connected at their lower ends into a drum 31. The gases flowing over the tube bank 30 also enter the uptake 28 and to this end are led rearwardly adjacent a side wall 32 of the setting and then transversely of the steam generator through a passage 33 in front of a rear wall 34 of the setting and behind a rear wall 35 of the furnace and an extension 36 of the rear wall 35 behind the tube bank 26, and the gases enter the uptake 28 to the rear of the gases from the tube bank 26.

The three rows 40 of tubes of the tube bank 26 nearest the furnace and two rows 41 of the tube bank 30 nearest the furnace are composed of large diameter widely spaced tubes and the remaining tubes of the banks are small diameter closely spaced tubes.

The tube bank 26 is divided by a transverse baffle wall 45 into a front section 43 and a rear section 44 through which the gases flow in parallel. The baffle wall 45 extends at right angles to the axis of the drum 25 and is formed of tubes of the bank, studded and supporting refractory material. In the gas flow path subsequent to the bank 26 the division between the gas flows is continued by a division wall 46 in the same plane as the baffle wall 45 and extending outwardly to the side wall 47 of the setting opposite to the side wall 32 and upwardly to a level slightly below the uptake 28. Within the front tube bank section 43 immediately outwardly of the tube rows 40 is a superheater 48 composed of horizontally U-shaped tubes arranged in nested fashion and connected to headers 49 and 50 which are at the front of the setting and which are each internally divided by spaced diaphragms so that the steam makes seven passes through the tubes relative to the gas stream. Refractory 51 on parts of the tubes of the outermost of the rows closes paths in which the gases might by-pass the superheater. The space within the rear tube bank section 44 to the rear of the superheater is occupied by eight rows 52 of vapor generating tubes. The distribution of gases from the combustion chamber 21 between the gas flow path over the front bank section 43 and the gas flow path over the rear bank section 44 is effected by sets 53 and 54 of dampers at the respective exits from the gas flow paths.

The tube bank 26 is particularly deep in the direction of gas flow; it may be seen that the tubes connected to the upper drum extend round approximately a full quadrant of the drum.

Between the tube bank 30 and the side wall 32 is disposed an air heater 60 arranged in a first section 61 and a second section 62 connected in series. The first section 61 includes U-shaped tubes pendently arranged at an inclination substantially parallel to the tube bank 30 and connected between inlet and outlet headers 63 and 64 respectively, and the second section 62 includes sinuous tubes also pendently arranged and inclined and connected to an inlet header 65 and to an outlet header 66 connected by tubes 67 to the inlet header 63.

Across the gas passage 33 and behind the tube bank 30 extends a vapor generating tube bank 68 also connected between the drum 25 and the header 31. The rear wall 34 at a location in the gas flow path subsequent to the tube bank 68 is pierced by an inlet 69 for the admission of exhaust gases from the diesel engine via a conduit 70 inclined in the direction of gas flow in the passage. Across the gas passage 33 and behind an outer portion of the rear bank section 44 extends, in the flow path of the joined gases from the combustion chamber 22 and the diesel engine, a vapor generating tube bank 71, the tubes of which are connected at their upper ends into the upper drum 25 and at their lower ends into the lower drum 27. The passage 33 is widened at the location of the tube bank 71 at the expense of the length of the outer portion of the rear bank section 44 by designing the wall extension 36 with its outer part forwardly of its inner part.

The economizer tubes extend parallel to the upper drum axis across the gas streams from the front bank section 43, rear bank section 44, and bank 71, so that in operation they receive approximately equal quantities of heat from each section.

The lower drum 27 is fed by groups 80 and 81 of downcomer tubes leading from near the front and rear ends respectively of the upper drum 25 to near the front and rear ends respectively of the said lower drum. The drum 31 is fed by pairs 82 and 83 of downcomer tubes leading from the front and rear ends respectively of the upper drum 25 to the front and rear ends respectively of the said drum. The header 24 is fed near its front end by a connector 84 leading from the drum 31 and near its rear end by a downcomer 85 leading from near the rear end of the upper drum. The rear downcomers 81, 83, and 85 pass outside the rear wall 34 at the rear of the pass 33; the upper and lower ends of the downcomer 85 and of the downcomers of the group 81 are brought forwardly in order to reduce the necessary lengths of the drums 25 and 27, the upper parts of the rear wall 34 being brought forwardly correspondingly so that in its upper part adjacent the drum 25 the passage 33 is of narrower depth from front to rear at 86 and in its lower part including the part adjacent the lower drum the passage is of narrower depth from front to rear at 87, as shown in Fig. 6.

The combustion chamber 21 is arranged to be fired by four oil burners 88, and the combustion chamber 22 by three oil burners 89, associated with respective sections 90 and 91 of a windbox 92 at the front of the furnace front wall 93. Arrangements are made for supplying exhaust gases from the gas turbine of the power installation to the windbox section 90 under the control of dampers 94 and to the windbox section 93 under the control of dampers 95.

The steam generator has a double walled casing, the outer wall 100 enclosing also the windbox 92, the downcomers, and the superheater and air heater headers. A fan is provided for supplying air during normal operation, when the gas turbine is in operation, to maintain a pressure within the space enclosed by the outer wall 100 at least as great as the pressure within the windbox. Should the gas turbine be out of operation, as is intended to be the case during steam raising, the fan will be employed to supply combustion air from the space enclosed by the outer wall 100, via appropriate additional dampers (not shown), to the windbox section 90, and should the gas turbine have been taken out of operation the fan will be used to cause an air flow through the air heater 60 to protect the latter against residual heat in the combustion chamber 22, the conenctions of the air heater 60 in the gases fluid path of the gas turbine part of the plant being appropriately closed and suitable other connections opened.

During normal operation the pressure of the steam supplied by the steam generator may be regulated by control of the rate of firing of the combustion chamber 21, the superheat temperature of the steam supplied may be regulated by control of the dampers 53 and/or the dampers 54 and the temperature of the air leaving the air heater may be regulated by control of the rate of firing of the combustion chamber 22.

Figure 5:
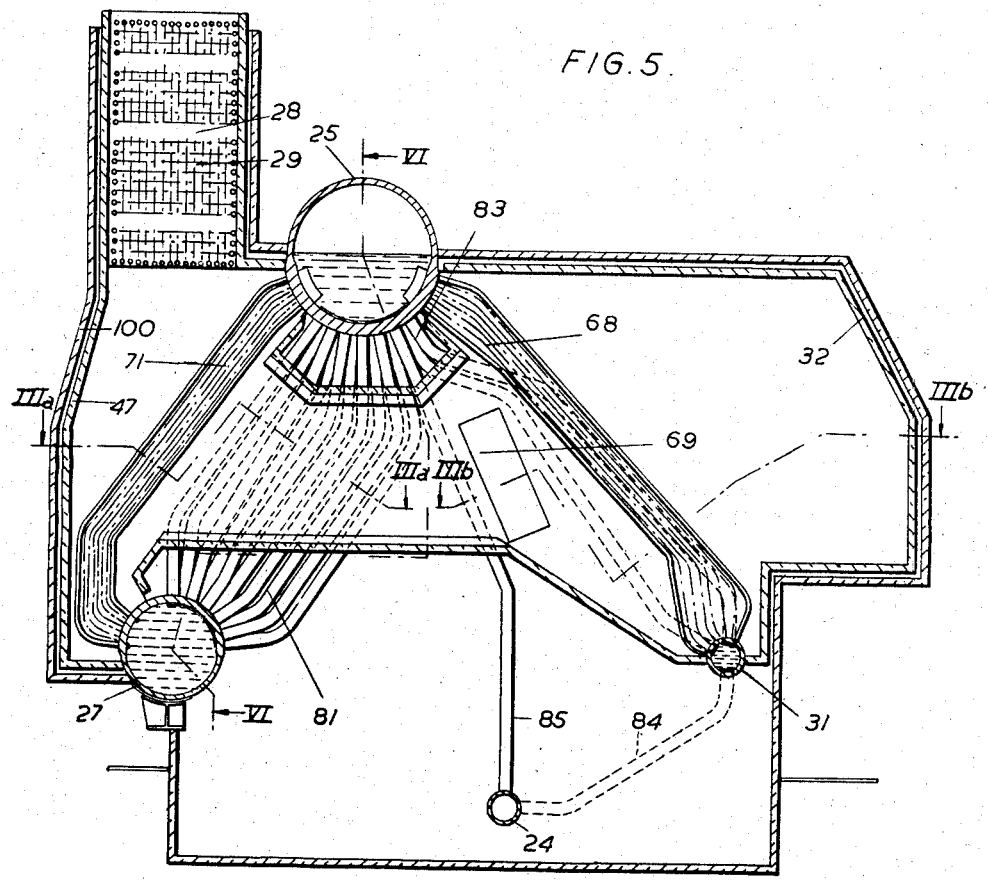
Fig. 5 is a front sectional elevation of the steam generator taken on the line V—V of Fig. 3.

The gas inlet 69 for diesel engine exhaust gases may be later in the gas flow path from the combustion chamber 22 than is shown in Fig. 5 should the exhaust gases be too low in temperature to be of much or any use in generating steam. Thus in the case of gases from two-stroke diesel engines it may be more desirable to introduce the exhaust gases through inlet 69ª at a location in the gas flow path behind the tube bank 71 and in front of the economizer 29, as indicated in Fig. 7.

The use of a single economizer at one side of the steam generator makes for ease of accommodation in a ship, of the steam generator and the gas uptake therefrom.

While in accordance with the provisions of the statutes I have illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A vapor generator comprising an upper vapor and liquid drum, a pair of lower liquid drums at opposite sides of said upper drum, inclined vapor generating tube banks connecting said lower drums to said upper drum, a longitudinal partition dividing the space between said tube banks into a pair of separate combustion chambers, means at the front end of said combustion chambers for independently firing the same, a group of vapor superheating tubes arranged within one of said tube banks, a group of air heating tubes at the outer side of said other tube bank, a gas outlet flue at the outer side of the tube bank enclosing said vapor superheating tubes, a separate transverse flue gas passage below the level of said vapor and liquid drum extending rearwardly of both of said combustion chambers and arranged to conduct flue gases from the outer side of said air heating tubes in a reverse direction to said gas outlet flue rearwardly of the discharge of gases thereto from the combustion chamber heating said vapor superheating tubes, and a bank of economizer tubes in said gas outlet flue extending across the gas streams discharged from the combustion chamber heating said vapor superheating tubes and from said transverse flue gas passage.

2. A vapor generator comprising an upper vapor and liquid drum, a pair of lower liquid drums at opposite sides of said upper drum, inclined vapor generating tube banks connecting said lower drums to said upper drum, a longitudinal partition dividing the space between said tube banks into a pair of separate combustion chambers, fuel burner means at the front end of said combustion chambers for independently firing the same, a windbox for supplying air to said fuel burner means, means for supplying heated air to said windbox, an outer wall spaced from and enclosing said windbox, means for separately supplying air under a positive pressure to the space between said windbox and outer wall, a group of vapor superheating tubes arranged within one of said tube banks and connected to said upper drum, a group of air heating tubes at the outer side of said other tube bank, a gas outlet flue at the outer side of the tube bank enclosing said vapor superheating tubes, and a separate transverse flue gas passage extending rearwardly of both of said combustion chambers and arranged to conduct flue gases from the outer side of said air heating tubes to said gas outlet flue, spaced banks of vapor generating tubes connected to said upper and lower drums in said transverse flue gas passage, and an inlet for hot waste gases into said transverse flue gas passage between the tube banks therein.

3. A tubular vapor generator comprising a furnace divided to form two separate combustion chambers, means defining parallel gas flow paths leading from one side of one combustion chamber for a gas flow therethrough in one direction, damper means for varying the distribution of furnace gases between the paths, banks of vapor generating tubes in said parallel gas flow paths, an elastic fluid heater disposed wholly in one of said parallel gas flow paths, means defining a gas flow path from the opposite side of the second combustion chamber for a gas flow therethrough in a substantially opposite direction, a second elastic fluid heater in the gas flow path from the second combustion chamber, a bank of vapor generating tubes between the second combustion chamber and the second elastic fluid heater, a transverse heating gas passage at one end of and separate from both of said combustion chambers, said transverse passage being at approximately the level of said elastic fluid heaters, and a single gas outlet flue at one side of said vapor generator and arranged to receive the gases from said parallel gas flow paths and through said transverse gas passage from the gas flow path from said second combustion chamber.

References Cited in the file of this patent

UNITED STATES PATENTS

| | | |
|---|---|---|
| 620,408 | Berry | Feb. 28, 1899 |
| 746,882 | Schulz | Dec. 15, 1903 |
| 842,284 | Wills | Jan. 29, 1907 |
| 1,920,198 | Jacobus | Aug. 1, 1933 |
| 2,124,215 | Stillman | July 19, 1938 |
| 2,231,015 | Lucke | Feb. 11, 1941 |
| 2,404,938 | Armacost et al. | July 30, 1946 |
| 2,471,755 | Karrer | May 31, 1949 |
| 2,539,255 | Karrer et al. | Jan. 23, 1951 |
| 2,653,447 | Heller | Sept. 29, 1953 |

FOREIGN PATENTS

| | | |
|---|---|---|
| 468,932 | Great Britain | July 15, 1937 |
| 609,674 | Great Britain | Oct. 5, 1948 |